United States Patent [19]
Croisier

[11] 3,855,539
[45] Dec. 17, 1974

[54] METHOD AND APPARATUS FOR NOISE REDUCTION IN DISCRETE PHASE MODULATED SIGNALS

[75] Inventor: Alain Croisier, Cagnes sur Mer, France

[73] Assignee: International Business Machines Corporation, Armonk, N.Y.

[22] Filed: Mar. 16, 1973

[21] Appl. No.: 342,005

[30] Foreign Application Priority Data

Apr. 4, 1972 France .............................. 72.12014

[52] U.S. Cl. .................... 329/104, 178/88, 325/42, 325/320, 325/323, 328/109, 329/110

[51] Int. Cl. .......................... H04b 1/10, H03k 5/01

[58] Field of Search ...... 329/104, 110, 136; 325/42, 325/320, 321, 323, 324; 178/88; 328/109

[56] References Cited

UNITED STATES PATENTS

| | | | |
|---|---|---|---|
| 3,568,078 | 3/1971 | Pelchat | 329/110 |
| 3,697,881 | 10/1972 | Nakagome et al. | 329/110 X |
| 3,736,511 | 5/1973 | Gibson | 325/42 X |
| 3,753,114 | 8/1973 | Burley | 325/320 |
| 3,760,167 | 9/1973 | Schrimshaw | 325/42 X |

*Primary Examiner*—Alfred L. Brody
*Attorney, Agent, or Firm*—John B. Frisone

[57] ABSTRACT

A method and apparatus for selectively reducing the phase shift contributions caused by transmission impairments such as noise and phase jitter, takes advantage of the fact that for phase modulated data signals capable of assuming one of $M$ discrete values, when the noise phase shift due to impairment in transmission is less than $\pi/M$ in a system capable of discriminating between discrete data encoded phase shifts of $2\pi/M$. Accordingly, each received discrete signal of phase magnitude $\theta$ is multiplied by $2\pi/M$. The integral portion of the product represents the phase shift of data whereas the fractional value represents the phase shift caused by impairments. The fractional value is multiplied by a parameter $\alpha$ and algebraically combined with a reference value. The reference value is subtracted from the discrete signal $\theta$ to reduce the phase shift of the transmission impairments. By varying the value of $\alpha$, the type of demodulation can be altered. For example, for $\alpha=0$, the demodulator is coherent, while for $\alpha=1$ the demodulator operates differentially. The reference value is in effect a predictor of the noise contribution and its magnitude is modified by the algebraic addition of the product of the fraction part and the parameter $\alpha$.

8 Claims, 8 Drawing Figures

METHOD AND APPARATUS FOR NOISE REDUCTION IN DISCRETE PHASE MODULATED SIGNALS

BACKGROUND OF THE INVENTION

This invention relates to data transmission systems and, more particularly, to a method and a device for demodulating signals phase modulated at discrete times.

Phase demodulation techniques are widely used and a detailed description thereof is provided, for example, in "Data Transmission," by William R. Bennet and James R. Davey, chapter 10, McGraw-Hill, New-York, 1965. In those data transmission system that utilize phase modulation techniques, the data to be transmitted modulate the phase of a carrier frequency, which modulated carrier is sent through a medium to a receiver coupled thereto. At the receiver, the data are extracted as a function of the value of the phase of the received signal. This extraction is generally done by comparing the phase of the signal received at a given sampling instant, either with a reference phase and phase of the signal received at a previous sampling instant, as described for example in the aforementioned publication. Theoretically, it would be desirable if the transmission medium should be perfectly transparent that is, the medium should be such that the output signals are the same as the input signals. In practice, however, the transmission media introduce disturbances such as frequency shift, phase shift, phase jitter, and white noise, which disturbances affect the signals obtained at the receiving end.

The frequency shift of the modulated carrier is due to the intermediate processing that takes place on the transmission lines and which cannot be controlled by the users of such lines, either at the receiving end or at the transmitting end, as for example occasioned by the remodulation of signals from one channel to another on a public transmission facility and in the reamplification of signals by transmission line repeaters.

The phase shift of the modulated carrier is due to the presence at the ends of the frequency bandwidth of the transmission channel of a difference between the actual phase of a frequency and the ideal linear phase frequency characteristic.

Still another cause is the phase jitter, which characterizes the possibility of the received phase of a given frequency exhibiting unwanted deviations from its average value. Phase jitter is considered to be the phase modulation of a carrier frequently due to variation in the power supplies of the intermediate remodulation and reamplification elements in the transmission path.

White noise is characterized by a flat frequency spectrum with equal contributions for all frequencies, but with the various frequencies exhibiting random phases.

The above phenomena have practically no effect on the low-speed data transmission systems, but become significant when the transmission speed is increased. For instance, if the phase modulation technique is used, in order to increase the data speed the number of distinct values of the phase of the modulated signal must be increased. As the number of distinct values is increased, it becomes more difficult to discriminate among the discrete phase values. These phenomena have different effects on those systems that use the phase modulation technique depending on whether such phase modulation is coherent or differential.

The known phase demodulators are designed to work with a specific type of phase modulation, such as coherent or differential phase modulation, and comprise additional devices intended to deal with a single type of disturbance. As an illustration of the limited capability of prior art phase demodulators to overcome transmission impairments, reference may be made to A. B. Chertok, "A Multiple Speed Partial Response Modem Featuring a Unique SSB Modulation - Demodulation System," in Conference Record, IEEE International Conference on Communication, June 9–11, 1969 Boulder, Col., Pages 21–29, section 29, who discusses phase jitter cancellation in single side band modulation.

The most commonly proposed solution to the phase jitter problem in coherent phase demodulators is to demodulate the received signal by recovering the carrier frequency along with the phase jitter, since equal and synchronous phase deviations are induced into all spectrum frequencies. This method requires the use of special devices to allow the carrier frequency to be recovered along with the phase jitter. These special devices are particularly delicate since they must perform a narrow band-pass filtering to separate the carrier from the spectrum frequencies and must also allow the phase jitter to be recovered. This is also described on page 24, section 29 of Chertok. It should be appreciated that such prior art demodulators are both complex and costly.

Attention is now directed to the prior art method of reducing effects of the frequency shift phenomenon in differential phase demodulators. Generally, the prior art differential phase demodulators essentially comprise a phase-locked oscillator which locks upon the phase of the signal received at a given sampling instant and compares this phase with that of the signal received at the next sampling instant. The method used to compensate for the effects of the frequency shift consists in controlling the phase-locked oscillator by means of the received signal upon which the frequency shift has been impressed so that this oscillator will oscillate at a frequency related to that of such signal.

The prior art methods, such as those briefly described above, have several drawbacks. Firstly, these various methods are associated with a specific type of discrete phase demodulation, namely, coherent or differential phase demodulation. Secondly, these methods and the devices associated therewith are intended to deal with specific disturbances and will not work in the case of transmission media that introduce other types of disturbances. Lastly, it will be apparent from the foregoing that the above-mentioned methods require the use of complex, and therefore costly, devices.

SUMMARY OF THE INVENTION

The invention comprises a method of demodulating discrete phasemodulated signals wherein a feedback value is subtracted from the value of the phase of the received signal and the result is multiplied by a first coefficient proportional to the number of distinct discrete phases used for transmission. The integral part of the product is representative of the data. The fractional part, of the product, if any, is used to extract the feedback value. The extraction process involves multiplying the fractional part by a second coefficient and integrating the product. Control of the value of the second coefficient permits one to select the type of phase modulation to be used and to selectively minimize the effects of various disturbances, e.g., white noise, phase jitter, frequency shift, etc..

The foregoing and other objects, features and advantages of the invention will be apparent from the following more particular description of the preferred embodiment thereof as illustrated in the accompanying drawings, wherein:

DESCRIPTION OF THE PREFERRED EMBODIMENT

Figure 1:
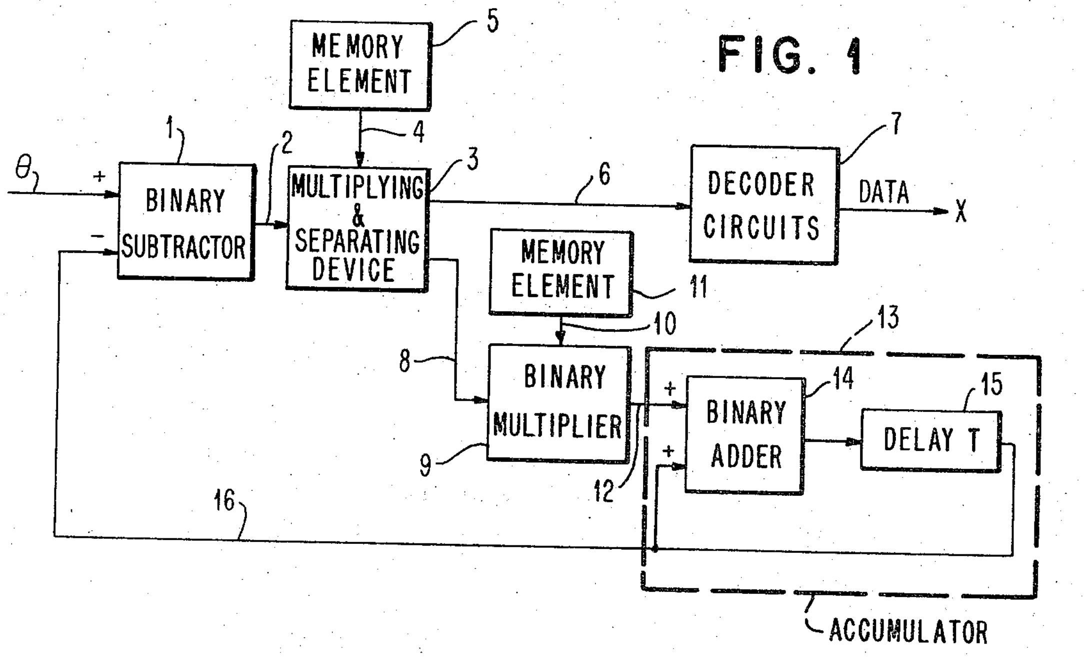
FIG. 1 shows a block diagram of the phase demodulator including the feedback correctional path of the present invention.

Referring now to FIG. 1, the numeric value, which is assumed to be binary-coded, of the phase $\theta$ extracted from the received signal is applied to the (+) input of a binary subtractor 1 whose output is connected via line 2 to one of the inputs of a multiplying and separating device 3. It should be understood that the assumption that this numeric value is binary-coded in no way limits the scope of the present invention. The other input of device 3 is connected via line 4 to the output of a memory element 5, which may be, for example, a binary register or, more simply, an array of prearranged connections. The integral part of the product of the multiplication performed by multiplying and separating device 3 is applied via line 6 to the decoding circuits 7. Decoding circuits output provides the decoded data X. Examples of such decoding circuits are given in the Bennett reference at pages 203–205. The fractional part, if any of the result of the multiplication performed by device 3 is applied via line 8 to one of the inputs of a binary multiplier 9. The other input of multiplier 9 is connected via line 10 to the output of a memory element 11, which may be similar to element 5.

The output of multiplier 9 is applied via line 12 to a conventional integrator or digital accumulator 13. In this example, accumulator 13 is comprised of a binary adder 14 and a delay element 15 providing a delay equal to T. The output of accumulator 13 is applied via line 16 to the (−) terminal of subtractor 1.

Figure 1A:
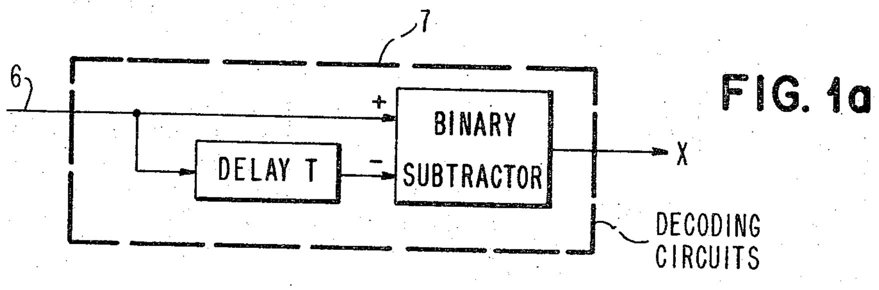
FIG. 1*a* illustrates an example of decoding circuits which can be used in the phase demodulator shown in FIG. 1.
Figure 1B:
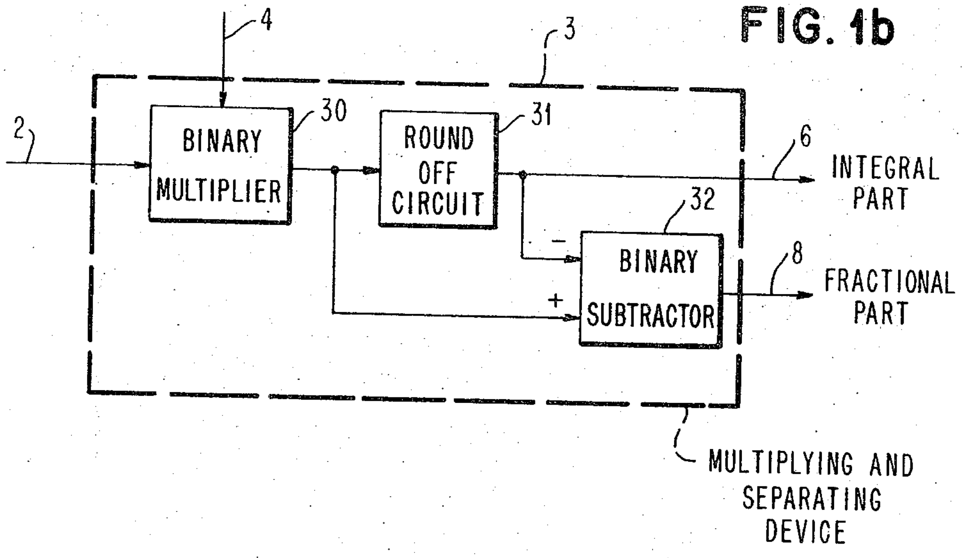
FIG. 1*b* illustrates an example of multiplying and separating device which can be used in the phase demodulator shown in FIG. 1.

FIG. 1*b* illustrates one type of multiplying and separating device 3 as shown in FIG. 1. This element partitions the received discrete phase signal into an integral valued portion representing encoded data, and a fractional valued portion representing noise. The output of binary subtractor 1 is applied via line 2, to one input of a binary multiplier 30. The other input of multiplier 30 is connected to the output of memory element 5 via line 4. Multiplier 30 performs the multiplication of the discrete value provided by subtractor 1 and the value stored in memory element 5. The result of this multiplication is applied to a conventional round off circuit 31, which round off circuit 31 provides the integral part of the last mentioned result, on line 6. The output of round off circuit 31 is further connected to the input (−) of a binary subtractor 32. The input (+) of subtractor 32 is connected to the output of multiplier 30. Subtractor 32 provides the difference between the result of said multiplication and said integral part, yielding the fractional part of the result of the multiplication performed by multiplier 30, on line 8.

The above-mentioned adders, subtractors and multipliers are conventional binary devices examples of which will be found in the book entitled "Arithmetic Operations in Digital Computers" by Richards, published by the D. Van Nostrand Co., Inc., N.Y., 1955. Additions and subtractions may be performed in either parallel or serial form depending upon the manner in which the binary numbers are provided. Chapter 4 of Richards, pages 81–135 provides a description of suitable adders and subtractors; multipliers are described on pages 136–165.

The operation of the device shown in FIG. 1 will now be described.

Where the phase modulation technique is used to transmit data, the received signal is a waveform whose amplitude is substantially constant and whose phase assumes given discrete values at the successive sampling instants.

The value of this phase of the $N^{th}$ sampling instant can be expressed as:

$$\theta(n-T) = Kn/M \cdot 2\pi + \theta o + \theta N(nT) + \theta j(nT) + \omega s \cdot n(T)$$

where $T$ is the sampling period, $M$ represents the number of possible discrete values the phase of the signal can assume, $Kn$ is an integer, such as $0 \leq Kn \leq M$, representative of the discrete value of the phase at the $N^{th}$ sampling instant, as defined by the transmitter as a function of the data to be transmitted, $\theta o$ is an unknown constant representative, in particular, of the phase shift introduced by the transmission medium, $\theta N(nT)$ represents the white noise contribution, $\theta j(nT)$ represents the phase jitter contribution, and $\omega s \cdot nT$ represents the frequency shift contribution.

In summary, the value of $\theta(nT)$ is the sum of a term $Kn/M \cdot 2\pi$, which carries the information, and the sum of the various noise contributions $\theta o$, $\theta N(nT)$, $\theta j(nT)$ and $\omega s \cdot nT$.

For clarity, we shall first consider the operation of the device at the time the phase $\theta(T)$, corresponding to the first sampling instant, is received.

The expression for $\theta(T)$ is obtained from expression (1), with $n$=1.

The binary value of the phase $\theta(T)$ extracted from the received signal is applied to the (+) terminal of subtractor 1. The extraction of the phase $\theta$ is outside the scope of the present invention and may be carried out, for example, by means of the digital phase detector described in copending patent application Ser. No. 393,893, filed Dec. 11, 1972 and entitled "A Digital Phase Detector" in the name of A. Croisier.

Subtractor 1 generates the same values, $\theta(T)$, since no signal has yet been applied to its (−) terminal. The value $\theta(T)$ is applied to one of the inputs of multiplying and separating device 3, which multiplies this value by the coefficient $M/2\pi$ stored in memory element 5, thus:

$$\theta(T) \times M/2\pi = [K1/M]\ 2\pi + \theta o + \theta N(T) + \theta j\ (T) + \omega s \cdot T) \times M/2\pi \quad (2)$$

or $$\theta(T) \times M/2\pi = K1 + (\theta o + \theta N(T) + \theta j(T) + \omega s \cdot T) \times M/2\pi \quad (3)$$

This multiplication yields factor $K1$, which is an integer, as previously mentioned, and the sum of the various noise contributions multiplied by the coefficient $M/2\pi$.

It is assumed that the demodulator operates under optimum conditions, that is, that the sum of the various disturbances is not sufficient to cause a phase skip. In other words, it is assumed that this sum is equal to less than half the difference between two successive values the phase of the signal can assume.

If $M$ is the total number of distinct discrete values the phase of the signal can assume, the difference between two successive values is $2\pi/M$.

Hence, $$\theta o + \theta N(T) + \theta j(T) + \omega s \cdot T < \pi/M \quad (4)$$

The noise term $(\theta o + \theta N(T) + \theta j(T) + \omega s \cdot T)\ M/2\pi$ in expression (3) is therefore less than 1 since it is the product of a term whose value is less than the product of the multiplication of $\pi/M$ by $M/2\pi$.

The result of the multiplication performed by multiplier 30 can therefore be split up into an integral part ($K1$), which is obtained by rounding off the result to the nearest integer and carries the information, and a fractional part, which lies between −0.5 and +0.5 and represents the noise term.

The integral part is applied via line 6 to the decoding circuits 7, which supply the decoded output $X$ and depends upon the type of modulation that is used. If the coherent phase modulation technique is utilized, the decoded data $Kn$ is directly available on line 6. If the differential phase modulation technique is used, wherein the data to be decoded $Xn$ is the difference between two successive values, than $Xn{=}Kn{-}K(n{-}1)$. The decoding circuits 7 are conventional and comprise a delay element $T$ and a subtractor to calculate the difference $Kn{-}K(n{-}1)$, as shown in FIG. 1a.

The fractional part, which is the noise term, is applied via line 8 to multiplier 9, which multiplies it by the coefficient $\alpha.2\pi/M$ stored in memory element 11, $\alpha$ being a parameter which will be defined later. This multiplication takes the form $$[(\theta o{+}\theta N(T) + \theta j(T) + \omega s \cdot T)\ (M/2\pi] \times [\alpha \cdot 2\pi/M] = \alpha(\theta o{+}\theta N(T) + \theta j(T) + \omega s \cdot T) \quad (5)$$

Thus, the output generated by multiplier 9 on line 12 is the sum of the various disturbances multiplied by parameter $\alpha$. This output is applied to accumulator 13.

Because of the presence of delay element 15 in accumulator 13, the result of the multiplication performed by multiplier 9 will only be available on line 16 after a time interval $T$ has elapsed, that is, while the value of the phase is being analyzed at the second sampling instant.

So far, we have considered the operation of the device at the time the phase $\theta(T)$, corresponding to the first sampling instant, is received. We shall now consider its operation at the time the phase $\theta(nT)$, corresponding to the $N^{th}$ sampling instant, is received.

As previously noted, multiplying and separating device 3 isolates the sum of the noise contributions, this sum is multiplied by a coefficient $\alpha$ and the product is applied to an accumulator.

The output of this accumulator is in turn applied to the (−) terminal of subtractor 1 in order to compensate for the noise contributions that are present in the value of the received phase.

It is to be noted that the relative positions of multiplier 9 and accumulator 13 as shown in FIG. 1 are not critical and can be interverted if desired.

Figure 2:
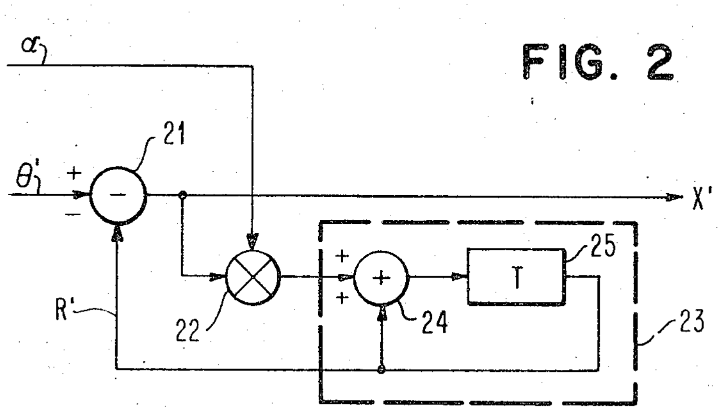
FIG. 2 shows an embodiment emphasizing the feedback path and multiplication process of the invention.

The manner in which this compensation is effected will be more readily understood by referring to the embodiment emphasizing the feedback path and multiplication process of the invention shown in FIG. 2.

This embodiment comprises a subtractor 21, a multiplier 22, and an accumulator 23 which includes an adder 24 and a delay element $T$ 25.

Since we are solely concerned with the effects of the various noise contributions, we shall assume that the sum $\theta(nT)$ of the noise contributions effecting the discrete value of the phase received at the sampling instant $n$ is applied to the (+) terminal of subtractor 21, this sum being expressed as $$\theta'(nT) = \theta o + \theta N(nT) + \theta j(nT) + \omega s \cdot nT \quad (6)$$

The value applied to the (−) terminal of subtractor 21 is designated $R'(nT)$, and the output of subtractor 21, which represents the effects of the various noise contributions on the decoded data, is designated $X'(nT)$.

It will be recalled that the so-called "delay theorem" states that if an incident signal is applied to the input of a delay element $T$, the resultant signal as obtained at the output of the delay element is equal to the product of the multiplication of the incident signal by $e^{-j\omega T}$.

If we apply this theorem to the values $\theta'(nT)$, $R'(nT)$ and $X'(nT)$, we get:

$$R'(nT) = e^{-j\omega T}[R'(nT) + \alpha X'(nT)] \quad (7)$$

or $$R'(nT) = \alpha X'(nT)\ [e^{-j\omega T}/(1-e^{-j\omega T})\ ] \quad (8)$$

and $$\theta'(nT) = X'(nT) + R'(nT) \quad (9)$$

Substituting the value of $R'(nT)$ from expression (8) in expression (9), we obtain:

$$\theta'(nT) = X'(nT)\ [(1-e^{-j\omega T} + \alpha e^{-j\omega T})/(1-e^{-j\omega_1 T})] \quad (10)$$

or $$X'(nT) = \theta'(nT)\ [(1-e^{-j\omega T})/1-e^{-j\omega T}+\alpha e^{-j\omega T})] \quad (11)$$

or $$X'(nT) = \theta'(nT)\frac{1}{1-\alpha+\frac{\alpha}{1-e^{-j\omega T}}} \quad (12)$$

Now, $$e^{-j\omega T} = \cos \omega T - j \sin \omega T \quad (13)$$

Substituting the value of $e^{-j\omega T}$ from expression (13) in expression (12), we get:

$$X'(nT) = \theta'(nT)\ 1/[(1-\alpha) + (\alpha/2) - j\ (\alpha/2) \text{ cotan } \omega T/2] \quad (14)$$

Hence, $$|X'(nT)/\theta'(nT)| = 1/\sqrt{(1-\alpha/2)^2 + (\alpha/2 \text{ Cotan } \omega T/2)^2} \quad (15)$$

Expression (15) represents the existing relationship between the sum $\theta'(nT)$ of the noise contributions applied to the device, and the output $X'(nT)$ of subtractor 21 representing the effects of the noise contributions on the data at the output of the device.

Expression (15) also represents the noise contribution filtering function performed by the device.

Before studying the above results where $\alpha$ is assigned various values, we shall briefly consider the effects of the various noise contributions upon the frequency spectrum of the received signal.

The white noise is characterized by a flat spectrum with equal contributions for all frequencies.

The phase jitter is characterized by a frequency spectrum limited to the lower frequencies, generally lower than 200Hz, but excluding the DC component.

The frequency shift results in a component which increases linearly by a value equal to $\omega s \cdot T$ between two successive sampling instants, where $\omega s = 2\pi\Delta f$, $\Delta f$ representing the frequency shift.

The phase shift $\theta o$ results in a DC component.

If we now assume that $\alpha$=1, expression (15) becomes:

$$|X'(nT)/\theta'(nT)| = 2 \sin \omega T/2 \quad (16)$$

Figure 3:
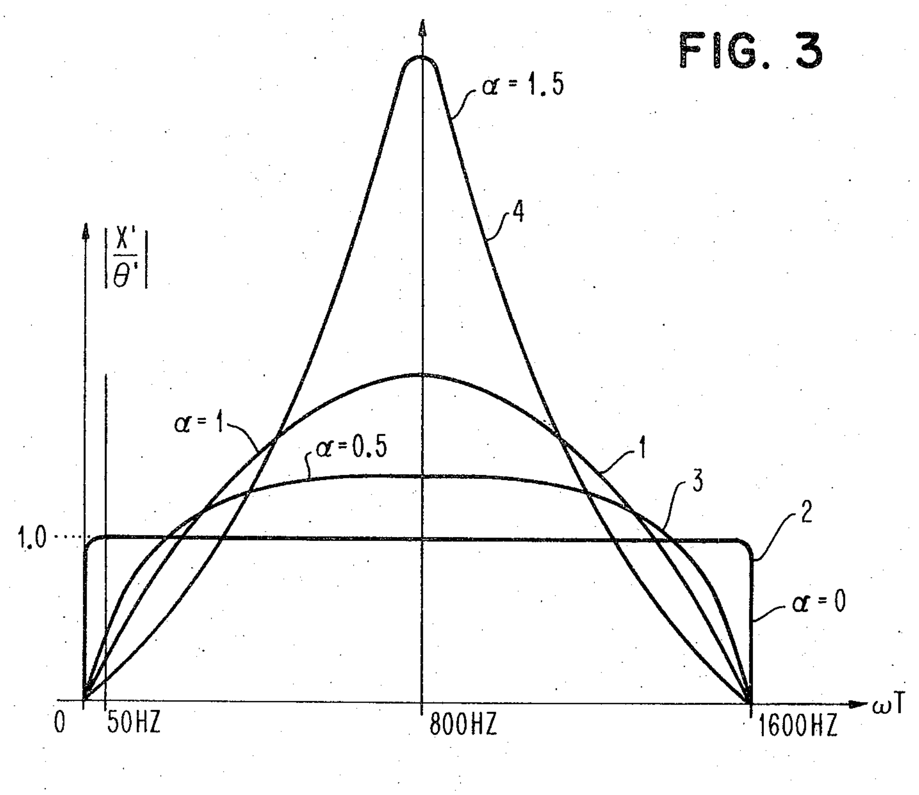
FIG. 3 is a diagram illustrating the various noise filtering functions which can be achieved by means of the device shown in FIG. 1.

This function is represented by curve 1 in FIG. 3 in which the sampling frequency has been arbitrarily set at 1,600Hz, that is to say, in which $T$=1/1,600Hz.

It will be seen that, for a sampling frequency of 800Hz, the noise power is increased by 3dB. On the other hand, the advantage of this type of demodulation are clearly apparent in FIG. 3, which shows that the disturbances are considerably attenuated at the lower frequencies, an attenuation of 14dB being obtained for a sampling frequency of 50Hz and an infinite attenuation for the DC component. In fact, these disturbances are due to the frequency shift and to the phase jitter.

This type of modulation is therefore effective to compensate for the effects of the phase shift and the phases jitter, but increases the amount of white noise. Also, the frequency shift is reduced to a constant phase shift equal to $\omega s \cdot T$, as explained below.

It will be seen that, if $\alpha$=1, the type of demodulation involved is a differential phase demodulation since expression (11) then becomes:

$$X'(nT) = \theta'(nT)\ (1-e^{-j\omega T}) \quad (17)$$

or $$X'(nT) = \theta'(nT) - \theta'((n-1)T) \quad (18)$$

Expression (18) shows that the noise contributions $X'(nT)$ affecting the data are equal to the difference between the noise contributions $\theta'(nT)$ and $\theta'((n-1)T)$, at two successive sampling instants.

In summary, if $\alpha$=1, the device functions as a differential phase demodulator.

Assuming now that $\alpha$=0, expression (15) becomes:

$$|X'(nt)/\theta'(nT)| = 1 \quad (18')$$

unless $\omega$=0 and $\omega = K\pi/T$, in which case $$|X'(nT)/\theta'(nT)| = 0$$

This function is represented by curve 2 in FIG. 3.

It will be seen that the DC component, that is, the effect of the phase shift, is eliminated and that the frequency shift is reduced to a constant phase shift, but that all other contributions remain unchanged since equation (18') is equal to 1.

This type of demodulation therefore provides optimum compensation for the white noise, but no protection against the phase jitter.

It will be observed that, if $\alpha$=0, the device acts as a coherent phase demodulator since giving this value to $\alpha$ is equivalent to opening the loop of the demodulator shown in FIG. 1, the extracted phases $\theta(nT)$ supplying the data $X(nT)$ directly.

Although the two types of demodulation considered above, as well as their effects, are well-known, the very structure of the device of the present invention permits one to obtain various type of demodulation by the simple expedient of varying the value of $\alpha$.

Curves 3 and 4 in FIG. 3 show two examples of such various types of demodulation.

Curve 3, which represents a compromise between curves 1 and 2, was obtained with $\alpha$=0.5.

It will be seen, that for a sampling frequency of 50Hz, an attenuation of 9dB is obtained, which is half way between the attenuations obtained with $\alpha$=0 and $\alpha$=1, while the white noise contribution is increased by no more that 1.2 dB.

If the phase jitter attenuation provided by the differential phase demodulation technique is not sufficient, the component at 50Hz can be attenuated still further by giving $\alpha$ a value greater than 1, but smaller than 2 since the circuit would become instable at this latter value. Curve 4 shows by way of example the demodulation obtained with $\alpha$=1.5.

The component at 50Hz is attenuated by 17dB while the white noise contribution is increased by 6dB. This type of demodulation will be referred to hereafter as super-differential demodulation.

The demodulator of the present invention can therefore be utilized with transmission media introducing different noise contributions, by merely changing the value of a single parameter to adapt the demodulator to a given transmission medium.

For example, if a particular transmission medium introduced a considerable amount of white noise, the value of $\alpha$ would be set to 0, if the medium introduced a considerable amount of phase jitter, the value of $\alpha$ would be changed to, for example, 1 or 1.5; in intermediate cases, the value of $\alpha$ would be adjusted so as to obtain optimum compensation.

Although the above discussion has been limited to the cases where $\alpha$=0, 0.5, 1, and 1.5 it should be understood that $\alpha$ may assume any value between $0 \leq \alpha < 2$. The case where $\alpha$=2 is excluded since the circuit would become instable at this latter value, as will be seen by referring to expression (15) giving the transfer function of the device. If we assume that $\alpha=2$, expression (15) becomes:

$$|X'(nT)/\theta'(nT)| = |\tan \omega T/2| \quad (15')$$

and since $|\tan \omega T/2| \rightarrow \infty$ when $\omega T/2 \rightarrow \pi/2$, the circuit becomes unstable.

The device illustrated by FIG. 1 can be improved in substituting a second order low-pass filter for the accumulator 13 shown in FIG. 1.

Figure 4:
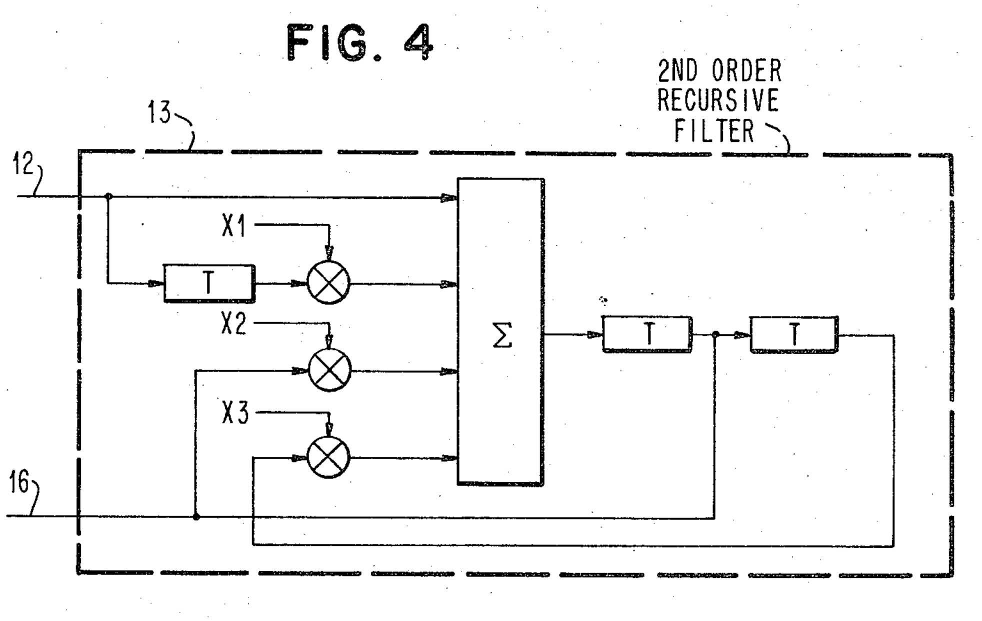
FIG. 4 shows a low-pass filter which can be used in the device of FIG. 1.

A second order low-pass filter is shown by way of example in FIG. 4. Identical components shown in this figure and in FIG. 1 are identified by the same reference numerals 12, 13 and 16. The filter is representative of a conventional recursive filter and comprises a summer $\Sigma$, several delay elements $T$, and three multipliers which perform multiplications by the filter coefficients $X1$, $X2$ and $X3$, respectively.

As an individual component, this filter does not form part of the present invention and will not be described in detail. For further information reference should be made to the publication entitled "IEEE Transactions on Audio and Electroacoustics," Special Issue on Digital Filtering, Vo. 1U-18, No. 2, June 1970.

Figure 5:
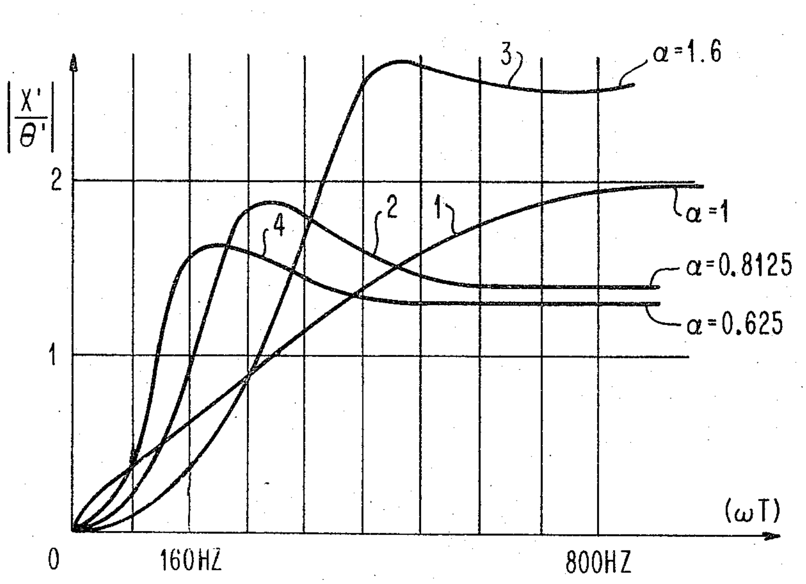
FIG. 5 is a diagram illustrating the various noise filtering functions which can be achieved by means of the phase demodulator using the filter shown in FIG. 4.

The results obtained with the demodulator of FIG. 1, incorporating the filter of FIG. 4, are shown in FIG. 5.

A sampling frequency $T$=1,600Hz was selected, and $\alpha$ and coefficients $X1$–$X3$ were assigned different values for curves 1–4, as shown in the table below:

| Curve | 1 | 2 | 3 | 4 |
|---|---|---|---|---|
| $\alpha$ | 1.0 | +0.8125 | +1.600 | +0.625 |
| $X1$ | 0.0 | −0.3125 | −0.300 | −0.500 |
| $X2$ | −1.0 | −1.750 | −1.750 | −1.875 |
| $X3$ | 0.0 | +0.750 | +0.750 | +0.875 |

It can be seen that the use of such a filter one to increase the attenuation for the very low frequencies in the region of 50He. For comparison purposes, curve 1 represents a differential demodulation ($\alpha$=1).

Figure 6:
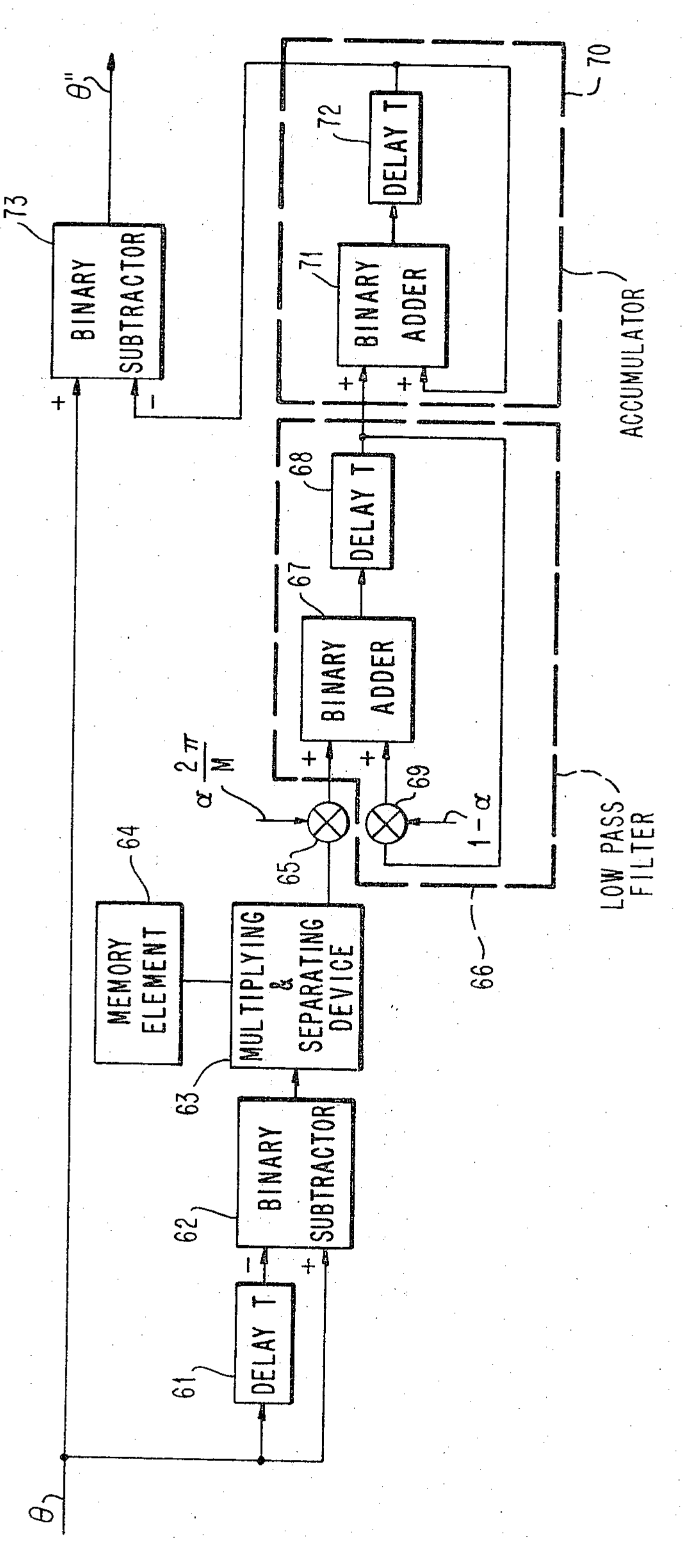
FIG. 6 shows a device which can be used in the demodulator of FIG. 1 to compensate for effects of the frequency shift.

FIG. 6 shows a device which can be used in conjunction with the demodulators previously described where the amount of frequency shift introduced by the transmission medium is considerable.

It will be recalled that the mathematical analysis of the noise contributions performed in relation to the embodiment shown in FIG. 2 led to expression (9):

$$\theta'(nT) = X'(nT) = R'(nT) \quad (9)$$

Now, the value of $R'(nT)$, as determined from the embodiment of FIG. 2, is $$R'(nT) = R'((n-1)T) + \alpha\, X'((n-1)T) \quad (19)$$

Substituting the value of $R'(nT)$ from expression (19) in expression (9), we obtain:

$$\theta'(nT) = X'(nT) + \alpha\, X'((n-1)T) + R'((n-1)T) \quad (20)$$

If we consider the $(N-1)^{th}$ sampling instant, expression (9) can also be expressed as:

$$\theta'((n-1)T) = X'((n-1)T) + R'((n-1)T) \quad (21)$$

Substracting expression (21) from expression (20), we find:

$$\theta'(nT) - \theta'((n-1)T) = X'(nT) + (\alpha-1)\, X'((n-1)T) \quad (22)$$

Then, from expression (6) giving the value of $\theta'(nT)$ and therefore that $\theta'((n-1)T)$:

$$\theta'(nT) - \theta'((n-1)T) = \theta N(nI) - \theta N(Cn-1)T) + \theta j(nT) - \theta j((n-1)T) + \omega s T \quad (23)$$

If the frequency shift introduced by the transmission medium is considerable, the white noise and phase jitter contribution may be ignored in expression (23). We then find:

$$\theta'(nT) - \theta'((n-1)T) = \omega s T \quad (24)$$

Comparing expression (22) and (24), we find:

$$X'(nT) + (\alpha-1)\, X((n-1)T) = \omega s T \quad (25)$$

or $$X'(nT) + (\alpha-1)\, X'((n-1)T) = 2\pi \Delta f T \quad (26)$$

Where the noise contributions $X'(nT)$ and $X'((n-1)T)$ affecting the data increase, the value of $X'\infty$ is given by the solution to equation (26) by causing $X(nT)$ and $X((n-1)T)$ to increase to infinity. Thus $$X'\infty = 2\pi\Delta f T/\alpha$$

In the case, for example, of a frequency shift of 10Hz and a sampling frequency of 1,600Hz, the noise contribution becomes:

$$X'\infty = 2.24°/\alpha$$

If $\alpha$=1, this becomes a serious problem and it will be necessary to extract the frequency shift contribution separately.

A device which can be used for this purpose is shown by way of example in FIG. 6.

The discrete value of the phase $\theta$ extracted from the received signal is applied to the device shown in FIG. 6 and the value $\theta'$ supplied by this device is then applied to the demodulator described above.

The frequency shift contribution is isolated by determining the difference between two successive values of the received phase, as expression (24) shows. This operation is performed by the delay element 61 introducing a delay $T$ and the subtractor 62. The result of the subtraction is then applied to a multiplying and separating device 63 which multiplies this result by the coefficient $M/2\pi$ stored in the memory element 64. Since we are solely concerned here with the noise contributions, only the fractional part of the product of the above multiplication need be used.

The multiplying and separating device 63 is a device identical to that illustrated in FIG. 1*b*, but in which device the integral part output is not used.

As previously, the fractional part is multiplied by the coefficient $\alpha \cdot 2\pi/M$ by multiplier 65. The output of multiplier 65 is applied to the input of a low-pass filter 66 which, in this example, is a first order digital recursive filter comprising an adder 67, delay element 68 and a multiplier 69. The low-pass filter 66 provides a first average of the various noise contributions over a period of time. The output of filter 66 is then applied to the input of a conventional integrator or digital accumulator 70 comprising an adder 71 and a delay element 72. The frequency shift isolated is applied to the (−) input of a subtractor 73. The value of the extracted phase $\theta$ is applied to the (+) input of a subtractor 73.

The value of $\theta''$ supplied by subtractor 73 will include an attenuated frequency shift contribution which will be compensated for by the demodulator described with reference to FIGS. 1–5.

It is to be noted that the transfer function of the circuit shown in FIG. 6 is exactly the same as that of the circuit shown in FIG. 1. However, since the phase jitter introduces an additional contribution in delay element 61 and subtractor 62, causing a number of random errors to occur at the output of multiplier 63, it is necessary to keep the value of $\alpha$ very small in order to attenuate such contributions, in which case the device shown in FIG. 6 has practically no effect on the general noise filtering function.

It should be understood that although the interconnections between the various functional blocks have been represented in the figures by a single line, this line may in fact represent a set of lines where the data are processed in parallel, that is, where the various values are available in the form of parallel binary words.

While the invention has been particularly shown and described with reference to a particular embodiment thereof, it will be understood by those skilled in the art that the foregoing and other changes in form and detail may be made therein without departing from the scope of the invention.

What is claimed is:

1. A method for demodulating discrete phase modulated signals and for selectively reducing the phase shift contributions thereto caused by one or more types of transmission impairments such as white noise, frequency shift, phase distortion, or jitter, the method comprising the steps of:

forming a difference signal from each discrete signal of phase magnitude $\theta$ and reference value $R$;

multiplying the difference signal by a first coefficient of the value $M/2\pi$, $M$ being the total number of distinct values that can be used to phase encode the data;

partitioning the product into an integral valued portion thereof $X$ representing the phase modulation of the data and a fractional valued portion $F$ representing the phase modulation of the transmission impairments, the phase shift contribution of the impairments being less than $\pi/M$ radians;

multiplying the fractional valued portion $F$ by a second coefficient $\alpha$, $\alpha$ lying within the range $0 \leq \alpha < 2$; and integrating the product $\alpha F$ to derive the said reference value $R$ which constitutes a prediction of the phase shift contribution due to the transmission impairments for each discrete phase signal $\theta$.

2. An apparatus for selectively reducing the phase shift contributions to discrete phase-modulated signals caused by one or more types of transmission impairments such as white noise, frequency shift, phase distortion or jitter, the apparatus comprising:

subtractor means having first and second inputs, said first input being adapted to receive the phase magnitudes $\theta$ of the received discrete phase modulated signals, extracted therefrom, and said second input receiving a reference value R;

first multiplying means having first and second inputs, said first input of said first multiplying means being connected to the output of said subtractor means and said second input of said first multiplying means being connected to a first memory element storing a first coefficient equal to $M/2\pi$, $M$ being the total number of distinct values the phase of the discrete phase modulated signals can assume;

separating means whose input is connected to the output of said first multiplying means, for supplying at a first output an integral valued portion of the product provided by said first multiplying means, representing the data, and at a second output a fractional valued portion $F$ of said product representing the transmission impairments;

second multiplying means having first and second inputs, said first input of said second multiplying means being connected to said second output of said separating means, and said second input of said second multiplying means being connected to a second memory element storing a second coefficient equal to $\alpha(2\pi/M)$, $\alpha$ lying within the range $0 \leq \alpha<2$; and integrating means whose input is connected to the output of said second multiplying means, and whose output provides said reference value $R$ which operates as a prediction of the phase shift contribution due to the transmission impairments for each phase magnitude signal $\theta$.

3. An apparatus according to claim 2, wherein a low-pass filter is substituted for said integrating means.

4. An apparatus according to claim 2, wherein in said second coefficient $\alpha = 1$.

5. An apparatus according to claim 2, wherein in said second coefficient $\alpha = 1.5$.

6. An apparatus for selectively reducing the phase shift contributions to discrete phase-modulated signals caused by one or more types of transmission impairments such as white noise, frequency shift, phase distortion or jitter, the apparatus comprising:

first subtractor means having first and second inputs, said first input being adapted to receive the phase magnitudes of the received discrete phase-modulated signals, extracted therefrom, and said second input receiving a first reference value;

a delay element whose input is adapted to receive the phase magnitudes of the received discrete phase modulated signals, said delay element providing a delay equal to the time between successive received discrete phase-modulated signals;

second subtractor means having first and second inputs connected to the input and the output of said delay element, respectively;

first multiplying means having first and second inputs, said first input of said first multiplying means being connected to the output of said second subtractor means, and said second input of said first multiplying means being connected to a first memory element storing a first coefficient equal to $M/2\pi$, $M$ being the total number of distinct values the phase of the discrete phase-modulated signals can assume;

first separating means whose input is connected to the output of said first multiplying means, for supplying at its output a fractional valued portion of the product provided by said first multiplying means;

second multiplying means for multiplying said fractional valued portion by a second coefficient equal to $\alpha(2\pi/M)$, $\alpha$ lying within the range $0 \leq \alpha<2$;

low-pass filter means whose input is connected to the output of said second multiplying means;

first integrating means whose input is connected to the output of said low-pass filter means and whose output is connected to said second input of said first subtractor means, whereby providing said first reference value;

third subtractor means having first and second inputs, said first input of said third subtractor being connected to the output of said first subtractor means, and said second input of said third subtractor receiving a second reference value;

third multiplying means having first and second inputs, said first input of said third multiplying means being connected to the output of said third subtractor means, and said second input of said third multiplying means being connected to the output of a second memory element storing a third coefficient equal to $M/2\pi$;

second separating means whose input is connected to the output of said third multiplying means, for supplying at a first output an integral valued portion of the product provided by said third multiplying means representing the data, and at a second output a fractional valued portion of said product representing the transmission impairments;

fourth multiplying means having first and second inputs, said first input of said fourth multiplying means being connected to the said second output of said second separating means, and said second input of said fourth multiplying means being connected to the output of a third memory element storing a third coefficient equal to $\alpha 2\pi/M$; and second integrating means whose input is connected to the output of said fourth multiplying means, and whose output provides said second reference value which operates as a prediction of the phase shift contribution due to the transmission impairments for each phase magnitude signal $\theta$.

7. A method for demodulating discrete phase-modulated signals and for selectively reducing the phase shift contributions thereto caused by one or more types of transmission impairments such as white noise, frequency shift, phase distortion, or jitter, the method comprising the steps of:

forming a difference signal from each phase magnitude $\theta$ of the received discrete phase-modulated signals, extracted therefrom and reference value $R$;

multiplying the difference signal by a first coefficient of the value $M/2\pi$, $M$ being the total number of distinct values that can be used to phase encode the data;

partitioning the product into an integral valued portion thereof $X$ representing the data and a fractional valued portion $F$ representing the transmission impairments;

multiplying the fractional valued portion F by a second coefficient $\alpha(2\pi/M)$, $\alpha$ lying within the range $0 \leq \alpha < 2$; and applying the product $\alpha(2\pi/M)\ F$ to integrating means whose output provides said reference value $R$ which operates as a prediction of the phase shift contribution due to the transmission impairments for each phase magnitude signal $\theta$.

8. A method for demodulating discrete phase-modulated signals and for selectively reducing the phase shift contributions thereto caused by one or more types of transmission impairments such as white noise, frequency shift, phase distortion, or jitter, the method comprising the steps of:

forming a difference signal from each phase magnitude $\theta$ of the received discrete phase-modulated signals, extracted therefrom, and reference value $R$;

multiplying the difference signal by a first coefficient of the value $M/2\pi$, $M$ being the total number of distinct values that can be used to phase encode the data;

partitioning the product into an integral valued portion thereof $X$ representing the data and a fractional valued portion $F$ representing the transmission impairments;

applying said fractional valued portion $F$ to integrating means; and multiplying the integrated fractional valued portion $F$ by a second coefficient $\alpha(2\pi/M)$, $\alpha$ lying within the range $0 \leq \alpha < 2$, the result of the multiplication providing said reference value $R$ which operates as a prediction of the phase shift contribution due to the transmission impairments for each phase magnitude signal $\theta$.

* * * * *